(No Model.) 2 Sheets—Sheet 1.
J. H. SWIHART.
COMPUTING SCALE.
No. 575,076. Patented Jan. 12, 1897.
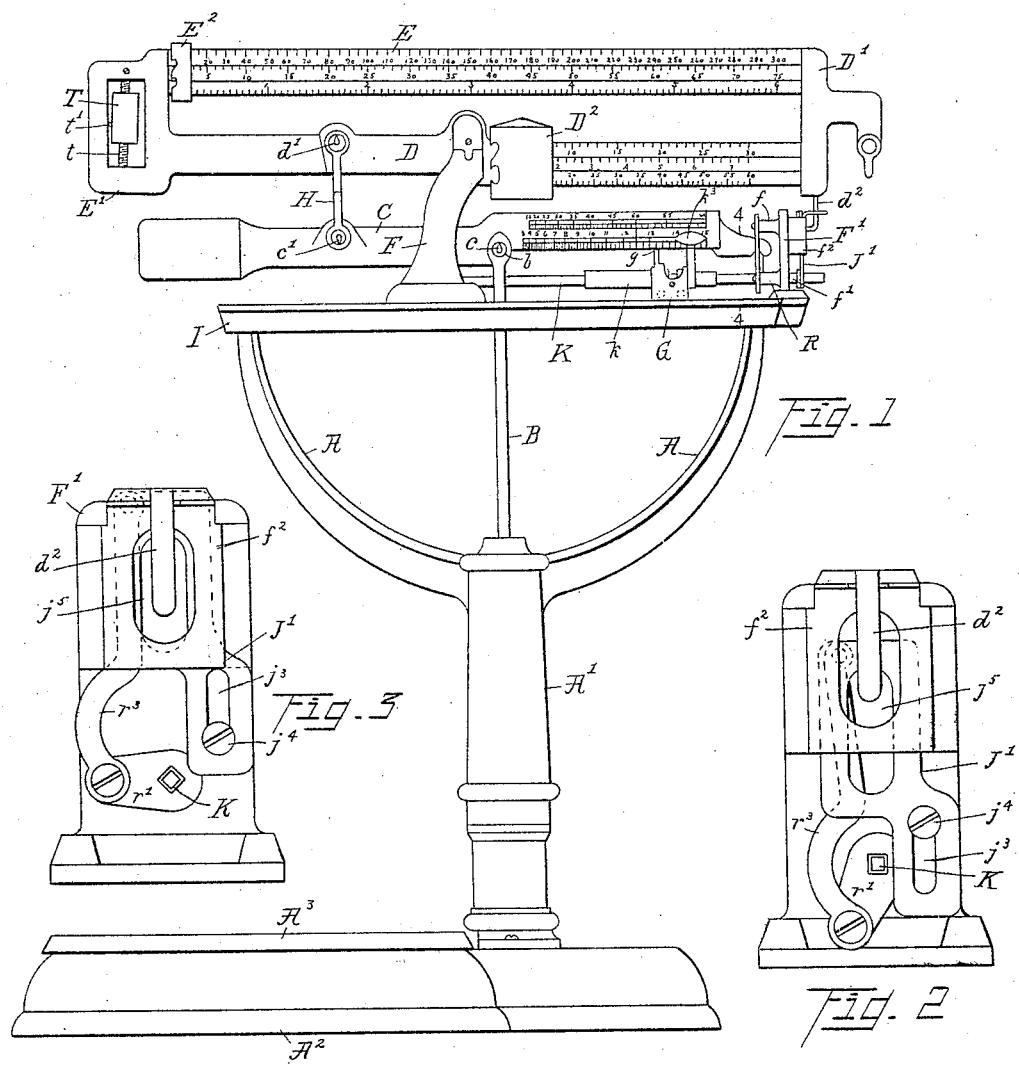
Witnesses.
L. Griswold
Helen M. Hutchison
Inventor.
John Henry Swihart
By E. L. Thurston
his attorney

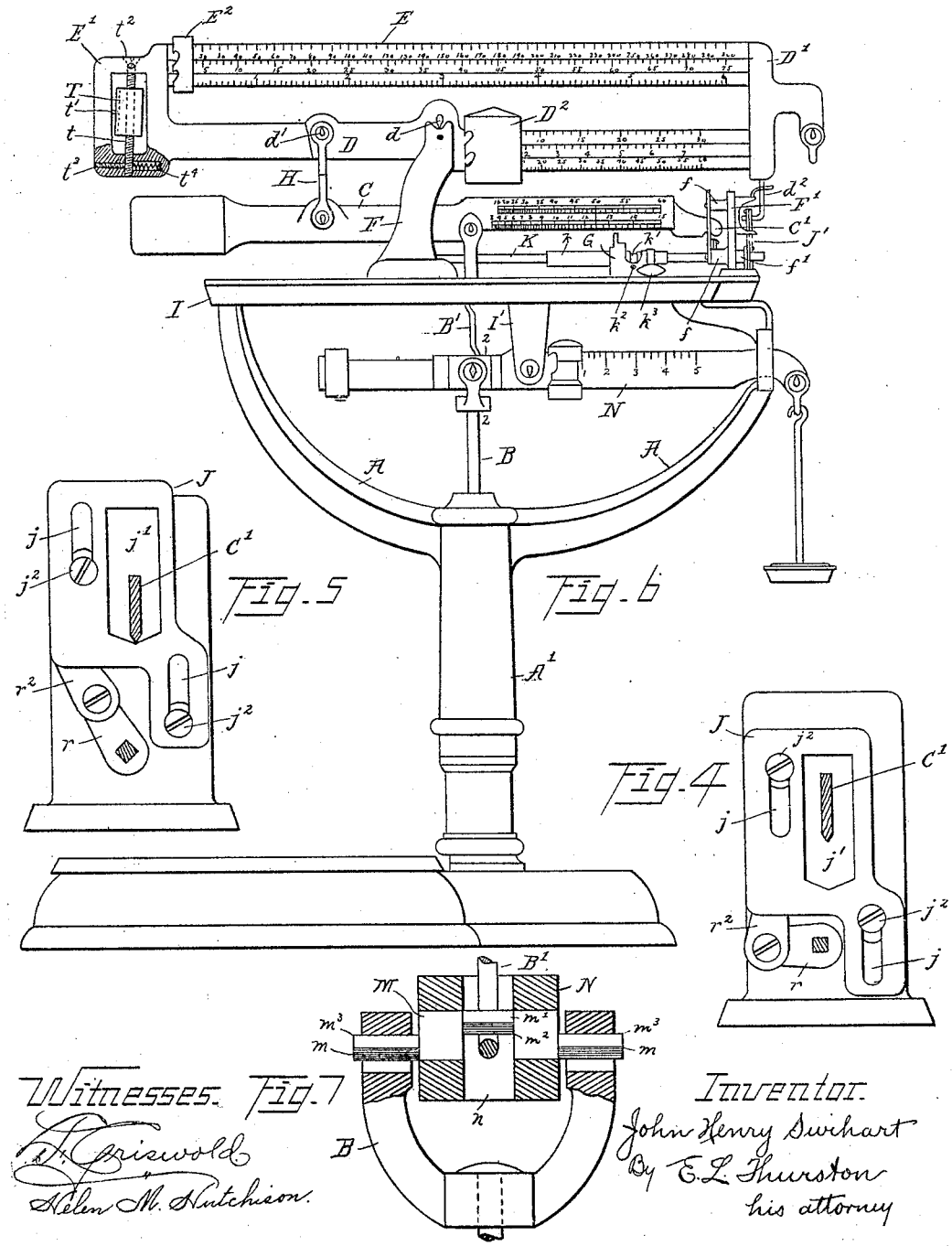

UNITED STATES PATENT OFFICE.

JOHN HENRY SWIHART, OF DAYTON, OHIO, ASSIGNOR TO THE NATIONAL COMPUTING SCALE COMPANY, OF CLEVELAND, OHIO.

COMPUTING-SCALE.

SPECIFICATION forming part of Letters Patent No. 575,076, dated January 12, 1897.

Application filed August 26, 1895. Serial No. 560,517. (No model.)

*To all whom it may concern:*

Be it known that I, JOHN HENRY SWIHART, a citizen of the United States, residing at Dayton, in the county of Montgomery and State of Ohio, have invented certain new and useful Improvements in Computing-Scales; and I do hereby declare the following to be a full, clear, and exact description of the invention, such as will enable others skilled in the art to which it appertains to make and use the same.

The invention relates to improvements in computing-scales and in combined computing and weighing scales.

The principal objects of the invention are to provide a scale of this class which shall be simple and durable in construction, which shall be absolutely accurate in its indications of weight and in its computations of values at any given rate per pound or other unit of weight, which shall be easy to manipulate to adapt it to determine weights or to compute values at different rates, and which shall have a larger capacity for its size than most, if not all, of the scales of this class which have hitherto been constructed.

Another object of the invention, as embodied in the form of scale shown in Figure 6, is to provide a weight or tare beam and novel connections between it and the computing mechanism, whereby said beam may be used independently to ascertain weight or conjointly with the computing mechanism to take off tare.

A scale containing my invention is one in which the several beams employed are fixed as to longitudinal movement relative to their several supports, to the mechanism connecting the beams, and to all of the fulcrums and pivots save only one, which fulcrum is movable, but which is supported and guided by means wholly independent of any of the beams, whereby the scale is never unbalanced, nor is its accuracy ever impaired by any movement or change of position of said fulcrum.

The invention consists in the construction and combination of parts hereinafter described, and pointed out in the claims.

In the drawings, Fig. 1 is a front elevation of my improved scale. Fig. 4 is a sectional view on line 4 4 of Fig. 1, viewed from the left, when the scale is in condition for use. Fig. 5 is a similar view of the same parts when the rate-beam has been raised preparatory to the moving of its fulcrum. Fig. 2 is an end view of the mechanism which draws the right-hand end of the value-beam down, said parts being shown in the relation to each other which they will occupy when said beam is drawn down. Fig. 3 is a similar view of the same parts when the scale is in condition for use. Fig. 6 is a side elevation of my improved scale when it contains the tare-beam, which is susceptible of being used either independently or jointly with the computing mechanism. Fig. 7 is a vertical section on line 2 2 of Fig. 6.

Referring to the parts by letter, $A^3$ represents the scale-platform, and $A^2$ the base. The levers and adjuncts below the platform and within the base may be of the usual construction and therefore are not shown in the drawings.

The description immediately following applies particularly to the form of scale shown in Fig. 1; but the scale shown in Fig. 6 is also embraced within said description, the two forms of scale differing only in the specific construction of the connecting-rod B and in the fact that the scale shown in Fig. 6 contains some features of construction which will be subsequently explained.

A hollow post or standard A' is secured to the base. It has two upwardly-extending arms A A, on which is rigidly secured the beam-supporting base I. The connecting-rod B passes entirely through the post A' and makes an operative connection between the rate-beam C and the platform-levers. This rod is forked at its upper end, and it embraces the rate-beam C. Both forks are provided with openings $b$, which receive the knife-edge bearing-pins $c$, which project from the sides of said rate-beam. This rod B hangs upon said bearing-pins and is connected at its lower end in the usual way with the platform-levers.

F represents a bifurcated standard which rises from and is fixed upon the beam-supporting base I and furnishes the fixed fulcrum for the two beams D and E, which are rigidly connected at their ends by the yokes $D'$ $E'$.

$d$ represents knife-edge pins which are rigidly fixed to and project from the sides of the beam D and rest upon the standard F, whereby said beams D and E are fulcrumed. The fulcrum of the beams D and E is therefore fixed, in the sense that it is not movable either upon the beams themselves nor with reference to the beam-supporting base I or other parts of the scale. Therefore these connected beams D and E, which, as I shall presently explain, may separately or conjointly be used as value-beams, vibrate in fixed arcs at all times.

The rate-beam C is balanced upon a free-swinging link H, which is suspended from a fixed point upon the beam D. This form of flexible connection between the rate-beam and value-beam makes it possible to change the fulcrum of the rate-beam, and consequently vary the arc in which it vibrates, without changing the position of the fulcrum of the value-beams. Both ends of the link H are bifurcated, so as to embrace the two beams C and D, and the forks are provided with openings to receive the knife-edge bearing-pins $c'$ and $d'$, which are fixed to the two beams, respectively.

It will be noticed that all of the fulcrums and points of connection between the various parts as heretofore described are fixed in position, in the sense that they have no movement upon or along said parts.

A fulcrum-block G, having a knife-edge $g$, which engages with the rate-beam and serves as a fulcrum therefor, is movable in a path parallel with the beam, whereby it is adapted to engage at any desired point with said beam. The block G rests upon and is supported by the beam-supporting base I, and it is preferably provided with rollers which bear upon said base and diminish the friction incident to moving said block.

A horizontal rod K, which is fixed in a position parallel to the rate-beam, passes through the block G and guides it in its movement. This rod K is supported in substantially the manner to be presently explained, so that it may be oscillated upon its longitudinal axis; but this movement does not change its relation to the rate-beam C nor to the supporting-base I, and therefore does not affect its function as a guide. The rod, in so far as it serves as a guide for the fulcrum-block G, is fixed in position. The purpose of mounting the rod K so that it may oscillate upon its longitudinal axis is to adapt it to take part in the moving of the rate-beam away from its fulcrum preparatory to moving the fulcrum-block. If some other specific mechanism were provided for so moving the rate-beam, the rod K might be made absolutely stationary.

The construction of the parts shown for moving the rate-beam out of contact with the fulcrum-block is as follows:

The rod K is made square except at one end, which is cylindrical and is mounted in the standard F. The other end passes through a cylindrical sleeve R, which is mounted in the standard F', said standard being fixed to the beam-supporting base I. The rod K passes through a square hole in a cylindrical sleeve $k$, which is mounted in the fulcrum-block G. In the sleeve is a circumferential groove $k'$, into which projects the point of a screw $k^2$, which penetrates the block G. The sleeve is also provided with a handle $k^3$, by which it may be turned in the block G, and this movement of the sleeve turns the rod K and the sleeve R.

Two vertically-movable plates J J' are mounted upon the standard F' on opposite sides thereof. The plate J is provided with two vertical slots $j\,j$, through which pass the screws $j^2\,j^2$, which screw into the bosses $f\,f$, thereby holding the plate J against said bosses and guiding it in a vertical path. In the middle of this plate J is a slot $j'$, into which an extension C' of the rate-beam projects. When the rate-beam is in contact with the fulcrum-block and ready for use, it does not touch the plate J.

The plate J' has a vertical slot $j^3$, through which the screw $j^4$ passes and screws into the boss $f'$. The upper end of the plate lies behind and is guided by the yoke $f^2$. Said plate is provided with a slot $j^5$, into which projects the horizontal end of a rod $d^2$, which is fixed to the yoke D' at the ends of the beams D and E. This rod does not touch the plate J' when the scale is ready to be used for weighing or computation.

Secured to opposite ends of the sleeve are the two lever-arms $r\,r'$, which are connected with the plates J and J', respectively, by the links $r^2\,r^3$.

When it is desired to move the fulcrum-block G, the hand-lever $k^3$ is moved down, thereby turning the rod K. This turns the sleeve R, and the two plates J and J' are moved, respectively, up and down by the lever-arms $r\,r'$ and the links $r^2\,r^3$. The plate J in moving up engages and lifts the end of the rate-beam. The plate J' in moving down engages the rod $d^2$ and through it draws the ends of the beams D and E down. Because said beams are connected on the opposite side of their fulcrum by the link H with the rear end of the rate-beam said end of the rate-beam is raised simultaneously with the raising of the front end, wherefore the substantially horizontal position of said rate-beam is preserved as it is lifted out of the path to be traveled by the fulcrum-block G. This block is then moved to the desired position relative to the rate-beam, whereupon the handle $k^3$ is raised and the described mechanism reverses its movement and the rate-beam is lowered into engagement with the fulcrum-block.

The rate-beam is provided with two sets of graduations. Those on its lower edge represent the rate per pound or other unit, beginning in the form shown with three cents and ending with fifteen, each succeeding graduation-mark indicating an increase of one cent. The spaces between the principal graduations are further subdivided into spaces, each of which represents an increase of one-fourth of a cent. The graduations on the upper edge of said beam each indicate an increase of five cents, and the spaces between the principal graduations are subdivided into spaces, each of which represents one cent.

In the form shown the value-beam is composed of two parallel beams D and E, connected by yokes D' and E', but obviously only one is necessary, and more may be used. Each beam is provided with two rows of value-graduations, one on the upper edge and one below it near the middle of the beam. Those on the upper edge of each are used in ascertaining values at the rate per pound indicated on the upper row of graduations on the rate-beam, while those in the lower row are in like manner used in conjunction with the lower row of rate-graduations. When two beams D and E are used, as shown, the lower graduations on beam E, which carries the lightest poise, may indicate values up to, say, seventy-five cents, and the upper graduations may indicate values up to three dollars. The lower graduations on beam D indicate values up to seven dollars and fifty cents, and the upper graduations to thirty dollars. The marks on the upper edge of the rate-beam indicate rates four times as great as the corresponding marks on the lower edge, and so, also, the value-marks on the upper edge of each value-beam D and E indicate amounts four times as great as those indicated by corresponding marks in the lower row.

Obviously the graduations upon the rate and value beams may be correspondingly changed to adapt the scale to any desired use without departing from the invention.

The beams D and E are provided with independent poises $D^2$ and $E^2$, and either beam may be used alone or both beams may be used conjointly by moving both poises and adding together the values indicated upon both beams. I believe that this is the first computing-scale having more than one value-beam and independently-movable poises for each in which both beams can be used conjointly, as described. The advantage of this construction is found in the fact that values may be calculated up to an amount equal to the sum of the highest value-graduations upon both beams. This scale has therefore a greater capacity than any prior scale having beams of the same length.

The foregoing description contemplates the use of the scale for computing values only, but it may be used for ascertaining weights. In order to adapt it for such use, the beams D and E, or either of them, are graduated near their lower edges, and when the movable fulcrum G is placed at a certain point on the rate-beam—in the present case at the mark on the lower edge thereof representing twelve and one-half cents—the scale may be used as a weighing-scale and either or both beams conjointly may be used to determine weights.

The beams D and E are therefore capable of being used either as value-beams or weight-beams. When the movable fulcrum has been set at the graduation indicating the given rate per pound, the tare may be taken off by the movement of the poise upon either beam, (preferably beam E,) and the value will thereafter be indicated upon the other beam.

The beams D and E are provided with a combined balance and gravity weight T, which is screw-threaded onto a vertical shaft $t$, which terminates at its upper end in a head $t^2$. The upper end of the shaft fits loosely in the hole in the upper arm of the yoke E', which connects said two beams D and E, while the lower end enters a longitudinal slot in the lower arm of said yoke. A horizontal pin $t'$ projects from said yoke into a vertical slot in the weight, (shown in dotted lines in Fig. 6,) whereby the weight is prevented from turning. The turning of the screw therefore raises or lowers the weight to adjust the gravity of the beams. The adjustment of the balance of the beam is effected by means of a screw $t^3$, which screws through the lower arm of the yoke E' against the lower end of the shaft $t$, whereby said shaft may be swung upon its head as a pivot. A coil-spring $t^4$, seated in the lower arm of the yoke, exerts a constant pressure against the lower end of the rod $t$, tending to hold it against the set-screw $t^3$.

Referring now to Fig. 6, it will be seen that the scale thereon shown contains certain additional parts which increase the capacity and practical value of the scale.

N represents a weight or tare beam balanced on knife-edge pivots in the usual way from the bracket I', which is fixed to the under side of the base I. The part of this beam N at one side of its fulcrum is enlarged and provided with a longitudinal vertical slot $n$. M represents a pivoting-bar which is secured to the beam, extending transversely across the slot $n$ and projecting from both sides of the beam. The projecting ends $m$ are provided with upper knife-edges $m^3$. The upper end of the lower section B of the connecting-rod is forked and is hung upon these ends $m$. The part $m'$ of the bar M, which extends across the slot $n$, has on its lower side a knife-edge $m^2$, which is in line with the upper knife-edges $m^3$ on the ends $m$.

B' represents a link which is hung loosely from knife-edges on the rate-beam. This link enters the slot $n$, but does not touch the sides thereof. Its lower end is curved beneath the pivot-bar $m'$, but so long as the scale is empty and the beam N is depressed at the end which carries the pendant this link does not touch said pivot. In fact, when the scale-platform is empty the lower end of this link hangs loosely in the slot $n$ and touches nothing. Therefore this beam N may be used to ascertain weights or to take off tare. When the pendant-carrying end of the beam N is lifted to a balance by the load on the platform, the pivot-bar $m'$ comes in contact with the lower end of the link B' and any further movement of the beam N is prevented without a corresponding movement of the rate-beam and other parts of the computing mechanism. The link B', when the parts are in this condition, forms a part of the connecting-rod, and the beam N and the double knife-edged pivot-pin M form a connection between said link B' and the rod B. Owing to the fact that knife-edge bearings on the parts $m$ $m$ and $m'$ are in line with each other the movement of the beam N on its fulcrum has practically no effect in throwing the two parts B B' out of line.

The beam N, besides being capable of use alone and to take off tare, increases the normal weighing capacity of the scale, because since it may be used in conjunction with the beams D and E the scale may be made to weigh as much in pounds as the sum of the separate capacities of the three beams D, E, and N.

Having described my invention, I claim—

1. In a computing-scale, the combination of a beam, with a movable fulcrum for said beam, and a support for said fulcrum which is wholly independent of the movable parts of the scale, and mechanism for relatively moving the beam and fulcrum out of engagement and holding them disengaged while the fulcrum is being moved, substantially as described.

2. In a computing-scale, the combination with a rate-beam graduated to indicate prices, of a movable fulcrum adapted to be moved the length of said graduations, said fulcrum being mounted free from the beam so that no part of its weight will be upon the beam, substantially as described.

3. In a computing-scale, the combination of a value-beam fulcrumed at a fixed point upon a fixed fulcrum, a rate-beam, a free-swinging link connected to fixed points upon said beams respectively, a movable fulcrum for said rate-beam, and means supporting and guiding said fulcrum wholly independently of the movable parts of the scale, substantially as described.

4. In a computing-scale, the combination of a value-beam fulcrumed at a fixed point upon a fixed fulcrum, and a flexible link depending from a fixed point upon said beam, with a rate-beam balanced upon said link when the scale is empty, a movable fulcrum for said rate-beam, and means supporting and guiding said fulcrum independently of the movable parts of the scale, substantially as described.

5. In a computing-scale, the combination of a value-beam balanced upon a fixed fulcrum, a flexible link hung from a fixed point upon said beam, and a rate-beam hung at a fixed point from said link, with a movable fulcrum adapted to bear against the under side of said rate-beam, a fixed support for said fulcrum, and a connecting-rod pivoted to a fixed point upon the rate-beam for connecting said rate-beam with the platform-levers, substantially as described.

6. In a computing-scale, the combination of a value-beam balanced upon a fixed fulcrum, a rate-beam, and a flexible link connecting said beams, with a movable fulcrum for said rate-beam, means for supporting and guiding said fulcrum wholly independently of the movable parts of the scale, and lifting mechanism for temporarily withdrawing the rate-beam out of engagement with the movable fulcrum preparatory to moving the latter, substantially as described.

7. In a price and weighing scale, the combination with a base, rigidly connected value and weight beams, a rate-beam, a flexible link interposed between said rate-beam and weight and value beams and upon which the rate-beam has a fulcrum when the scale is empty, of a movable bearing for said rate-beam mounted wholly below and independently of said rate-beam, said bearing forming the fulcrum of said rate-beam, when the scale is loaded, substantially as and for the purpose specified.

8. In a computing-scale, the combination with a rate-beam, of a movable fulcrum-block for changing the fulcrum of said beam, a parallel rod for guiding said fulcrum-block in its horizontal movement, and means operated by said rod to elevate the rate-beam and thereby permit the movement of the movable bearing, substantially as described.

9. In a computing-scale, the combination of a rate-beam, stationary as to horizontal movement, a movable fulcrum-block for changing the fulcrum of said beam, a horizontal rod mounted so as to oscillate upon its longitudinal axis, and adapted to guide said fulcrum-block, and means operated by said rod, for elevating the said beam, and thereby permitting free movements of said movable fulcrum-block as described.

10. In a computing-scale, the combination of a rate-beam, stationary as to horizontal movement, a movable fulcrum-block to change the fulcrum of said beam, a horizontal rod mounted so as to oscillate upon its longitudinal axis and adapted to guide said fulcrum-block and to permit the movement thereof, lever-arms, and vertically-movable plates, actuated by said rod and adapted to elevate said rate-beam preparatory to moving said fulcrum-block, substantially as described.

11. In a price and weighing scale, the combination with the value and rate beams, of a flexible coupling between said beams, a movable fulcrum-block to change the fulcrum of said rate-beam, a sleeve mounted in said fulcrum-block, an angular rod passing through said sleeve, a second sleeve surrounding the rod and mounted in a fixed bearing, lever-arms secured to said sleeve, vertically-movable plates having slots into which parts of said beams project, and links connecting said plates and lever-arms, and means for actuating said rod, substantially as described.

12. In a price and weighing scale, the combination with a connecting-rod, value, weight and rate beams, stationary as to longitudinal movement, a flexible link connecting the value and weight beams with the rate-beam, of a changeable bearing for said rate-beam and movable thereunder, a parallel guide-rod for said bearing and means actuated by said rod to elevate the rate-beam to permit the movement of said bearing, substantially as described.

13. In a price and weighing scale, the combination with beams of a combined gravity and balance weight, adjustable both vertically, and in an arc of a circle, and means for effecting said adjustments, substantially as described.

14. In a computing-scale, the combination of the computing mechanism, a balanced beam N, and a transverse pivot-pin carried thereby and located at one side of the fulcrum of said beam, with a flexible link suspended from the computing mechanism and having a bent lower end which passes under but lies out of contact with said pivot-pin when the scale is empty, but is engaged by said pivot-pin when said beam end is drawn down by the weight on the platform, substantially as and for the purpose specified.

15. In a computing-scale, the combination of the computing mechanism, and a balanced tare-beam having a transverse pivot-pin carrying upper and lower knife-edges which are in line with each other, with a two-part connecting-rod of which the lower part is suspended from the upper knife-edges, and the upper part is suspended from the computing mechanism, and extends beneath and lies close to the lower knife-edges, but out of contact therewith while the scale is empty, substantially as specified.

16. In a computing-scale, the combination of the computing mechanism, and a balanced tare-beam having a vertical slot, a pivot-bar secured thereto crossing the slot and projecting from both sides of the beam, said pivot-bar having knife-edges, which are in line with each other, upon the upper and lower sides respectively of the part within the slot and the projecting ends, a two-part connecting-rod, consisting of the part B which is suspended from the upper knife-edges, and the part B' which is suspended from the computing mechanism and extends beneath, but, when the scale is empty, lies out of contact with, the lower knife-edges, substantially as and for the purpose specified.

17. In a computing-scale, the combination of the value-beam, the rate-beam and a flexible connection between the beams, of a balanced tare-beam having a longitudinal vertical slot, and a pivot-bar extending across said slot and projecting from both sides thereof, the part which spans the slot and the projecting ends having knife-edges in line with each other but upon the upper and lower sides respectively, a link suspended from the rate-beam and passing beneath and lying out of contact with the pivot-bar when the scale is empty, and a connecting-rod suspended upon said pivot-bar, substantially as and for the purpose specified.

In testimony whereof I affix my signature in presence of two witnesses.

JOHN HENRY SWIHART.

Witnesses:
E. L. THURSTON,
L. S. GRISWOLD.